(12) United States Patent
Ko (10) Patent No.: US 11,577,773 B2
(45) Date of Patent: Feb. 14, 2023

(54) STEERING COLUMN OF VEHICLE (71) Applicant: HL MANDO CORPORATION, Gyeonggi-do (KR)

(72) Inventor: Bong Sung Ko, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/737,019

(22) Filed: May 5, 2022

(65) Prior Publication Data

US 2022/0355851 A1 Nov. 10, 2022

(30) Foreign Application Priority Data

May 7, 2021 (KR) .......................... 10-2021-0059365

(51) Int. Cl.
*B62D 1/184* (2006.01)

(52) U.S. Cl.
CPC .................................... *B62D 1/184* (2013.01)

(58) Field of Classification Search
CPC ...................................................... B62D 1/184
See application file for complete search history.

(56) References Cited

FOREIGN PATENT DOCUMENTS

| KR | 20170121792 A | * | 11/2017 | |
| KR | 102267718 B1 | * | 6/2022 | |
| WO | WO-2021082917 A1 | * | 5/2021 | ............. B62D 1/184 |
| WO | WO-2021210823 A1 | * | 10/2021 | |

* cited by examiner

*Primary Examiner* — Drew J Brown
(74) *Attorney, Agent, or Firm* — Ladas & Parry, LLP (57) ABSTRACT

According to the present embodiments, it is possible to prevent a tooth-on-tooth engagement between gear teeth, which may occur during the telescoping operation of the steering column, thereby leading to stable locking of the steering column, enhancing the driver's feeling of lever manipulation, and preventing damage to components.

16 Claims, 7 Drawing Sheets

STEERING COLUMN OF VEHICLE

CROSS-REFERENCE TO RELATED APPLICATION

This application claims priority from Korean Patent Application No. 10-2021-0059365, filed on May 7, 2021, which is hereby incorporated by reference for all purposes as if fully set forth herein.

BACKGROUND

Field

The present embodiments relate to a steering column of a vehicle and, more particularly, to a steering column of a vehicle capable of preventing a tooth-on-tooth engagement between gear teeth that may occur when a telescoping operation is locked.

Description of Related Art

In general, the steering column of a vehicle comes with telescoping and tilting features by which the driver may adjust the protrusion and tilt angle of the steering wheel to fit his height or body shape to enable smooth steering.

In the manual-type steering column, the telescoping operation of the steering column is locked or unlocked by the driver's manipulation on the lever. As the movable gear is engaged with the fixed gear, the telescoping operation is locked and, as the movable gear is separated from the fixed gear, the telescoping operation is unlocked.

However, when the conventional steering column is switched from the unlocked state to the locked state by lever manipulation, the fixed gear and the movable gear do not mesh accurately, and the mounts of the fixed gear overlap the mountains of the movable gear, causing a tooth-on-tooth engagement.

If the tooth-on-tooth engagement occurs, the driver's feeling of lever manipulation may be deteriorated, and the lever or the gear may be damaged. Further, if shocks occur to the vehicle due to failure in proper fixation of the steering column, the steering column may pop up, and the driver may not be protected.

BRIEF SUMMARY

The present embodiments have been conceived in the foregoing background and relate to a steering column of a vehicle which may prevent a tooth-on-tooth engagement between gear teeth, which may occur during the telescoping operation of the steering column, thereby leading to stable locking of the steering column, enhancing the driver's feeling of lever manipulation, and preventing damage to components.

According to the present embodiments, there may be provided a steering column of a vehicle, comprising a plate bracket including a pair of wings facing each other and fixed to a vehicle body, a distance bracket coupled to an outer circumferential surface of an upper column, positioned between the pair of wings, and including an elongated hole formed in a telescoping direction, an adjust bolt penetrating the pair of wings and inserted into the elongated hole, a lever portion coupled to a first end of the adjust bolt to move the adjust bolt in an axial direction of the adjust bolt, a first gear coupled to a first end of the adjust bolt to be movable within a predetermined range in the telescoping direction, and a second gear fixed to the second end of the adjust bolt and engaged with or disengaged from the first gear as the adjust bolt is moved in the axial direction of the adjust bolt.

According to the present embodiments, it is possible to prevent a tooth-on-tooth engagement between gear teeth, which may occur during the telescoping operation of the steering column, thereby leading to stable locking of the steering column, enhancing the driver's feeling of lever manipulation, and preventing damage to components.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 1:
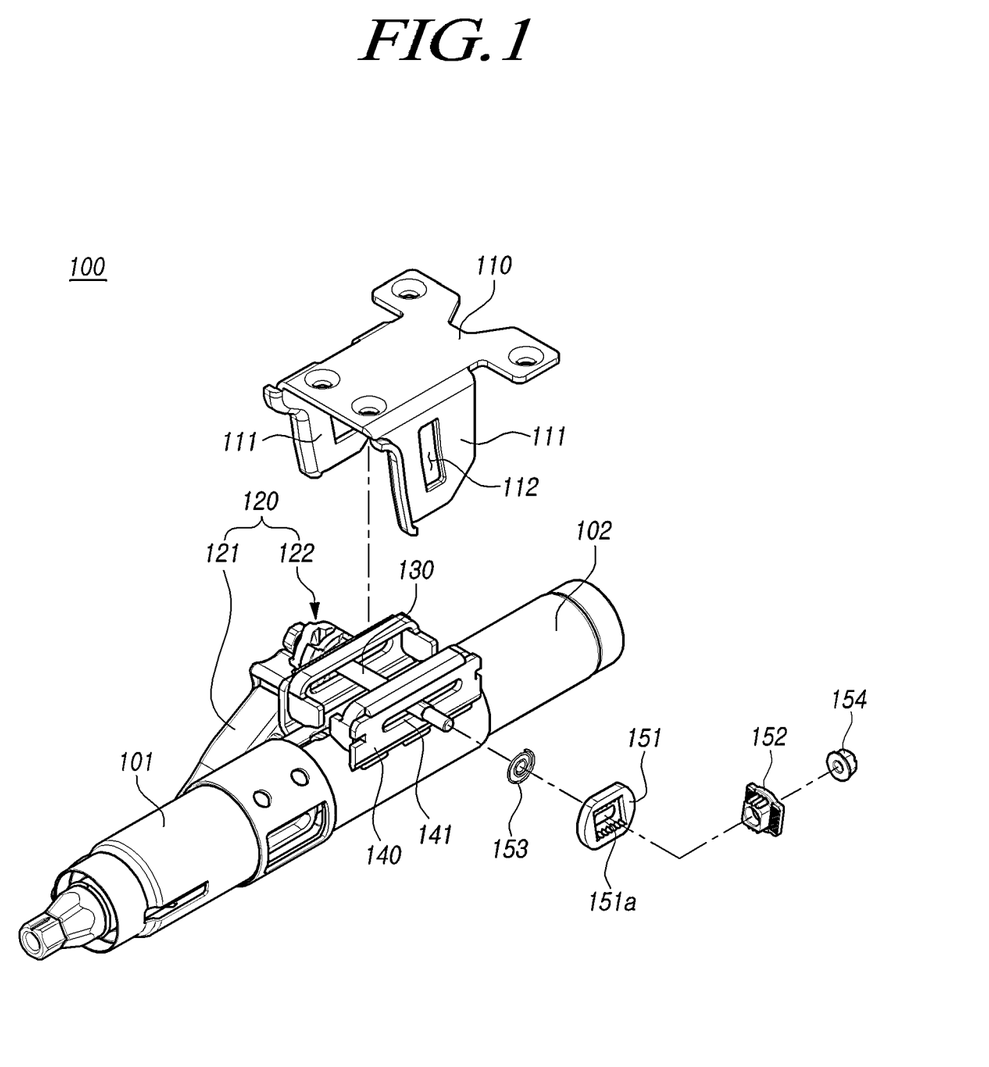
FIG. 1 is an exploded perspective view illustrating a steering column for a vehicle according to the present embodiments.
Figure 2:
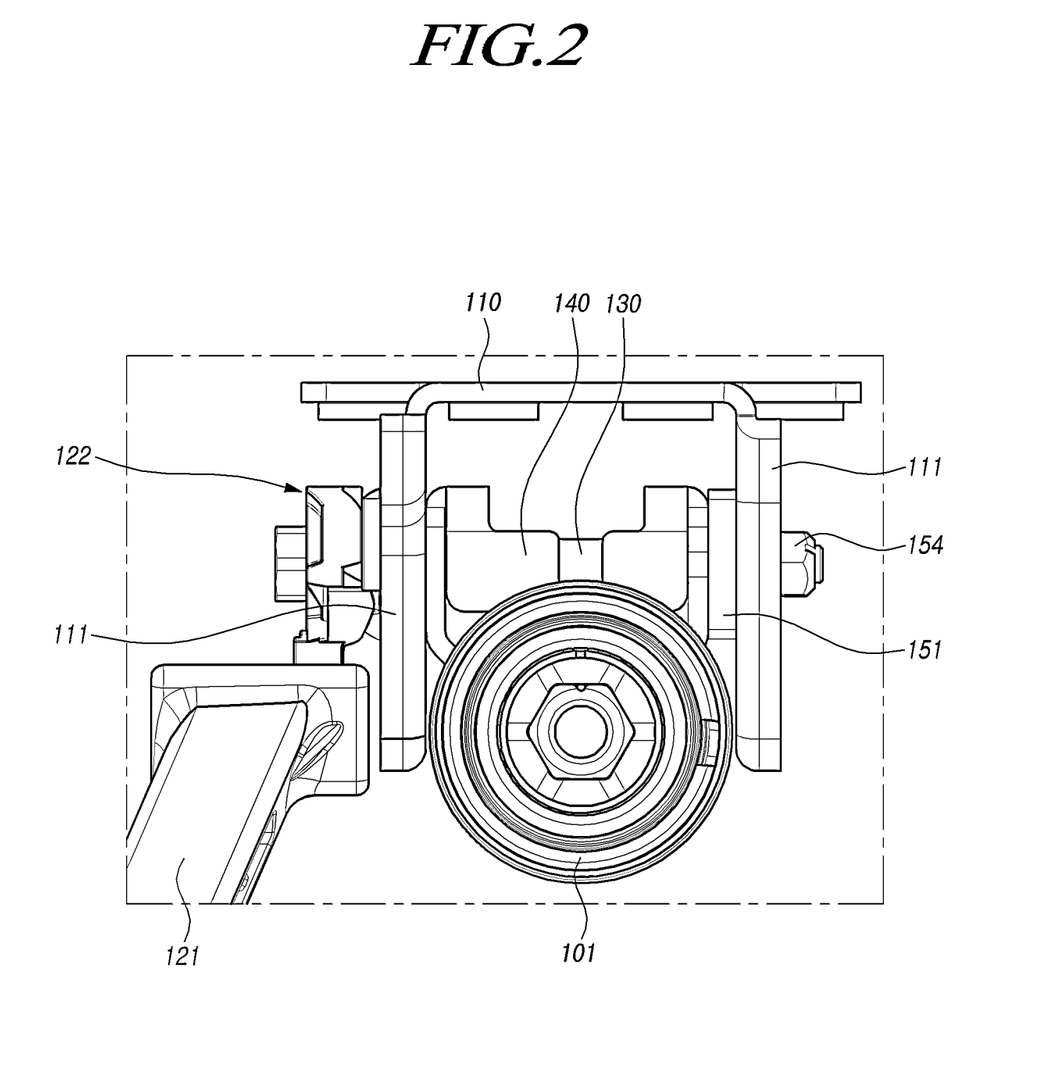
FIG. 2 is a front view illustrating an assembled state of FIG. 1.
Figure 3:
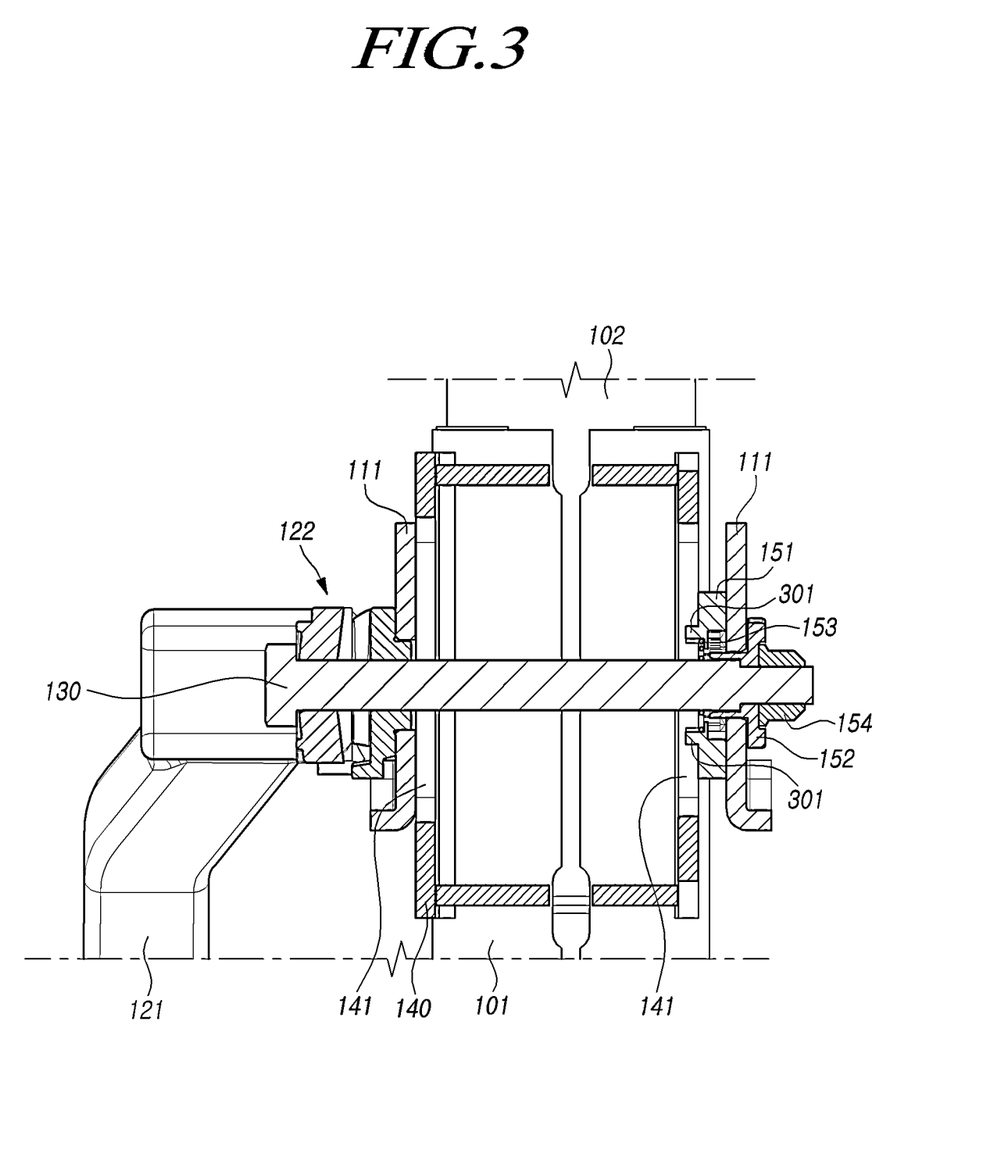
FIG. 3 is a cross-sectional view of FIG. 2.
Figure 4:
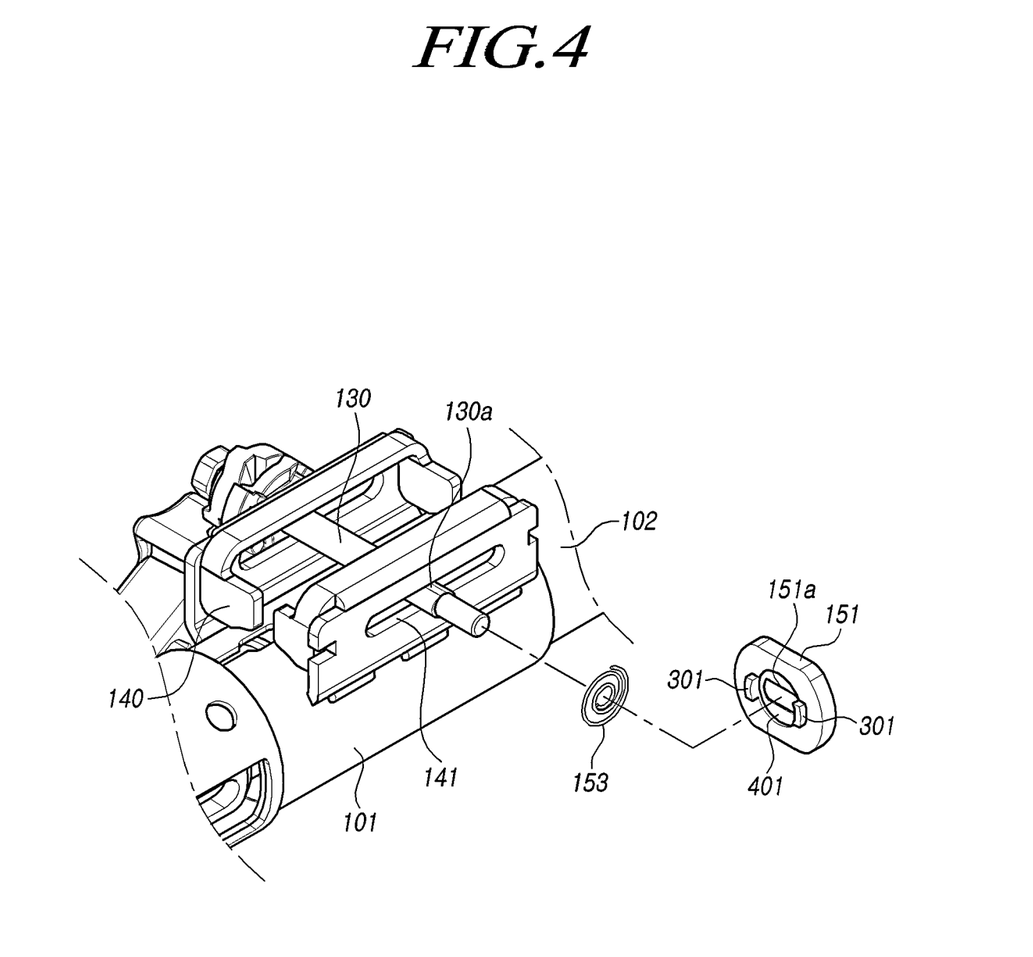
FIG. 4 is an exploded perspective view illustrating a portion of FIG. 1.
Figure 5:
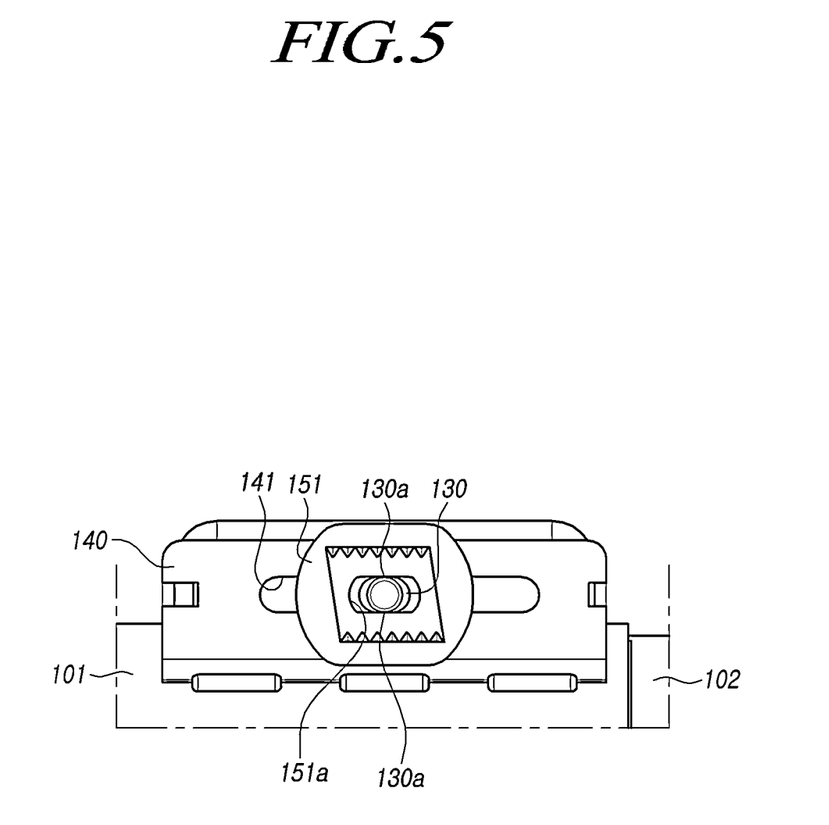
FIG. 5 is a side view illustrating a portion of FIG. 2.
Figure 6:
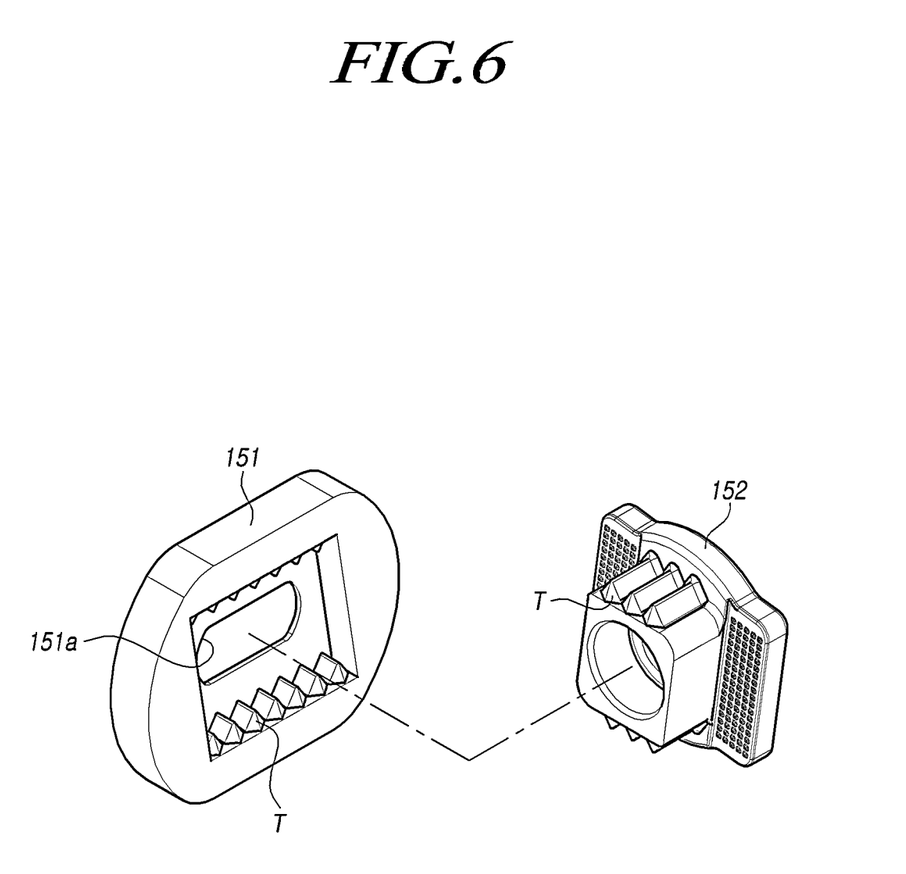
FIG. 6 is a perspective view illustrating a portion of FIG. 1.
Figure 7:
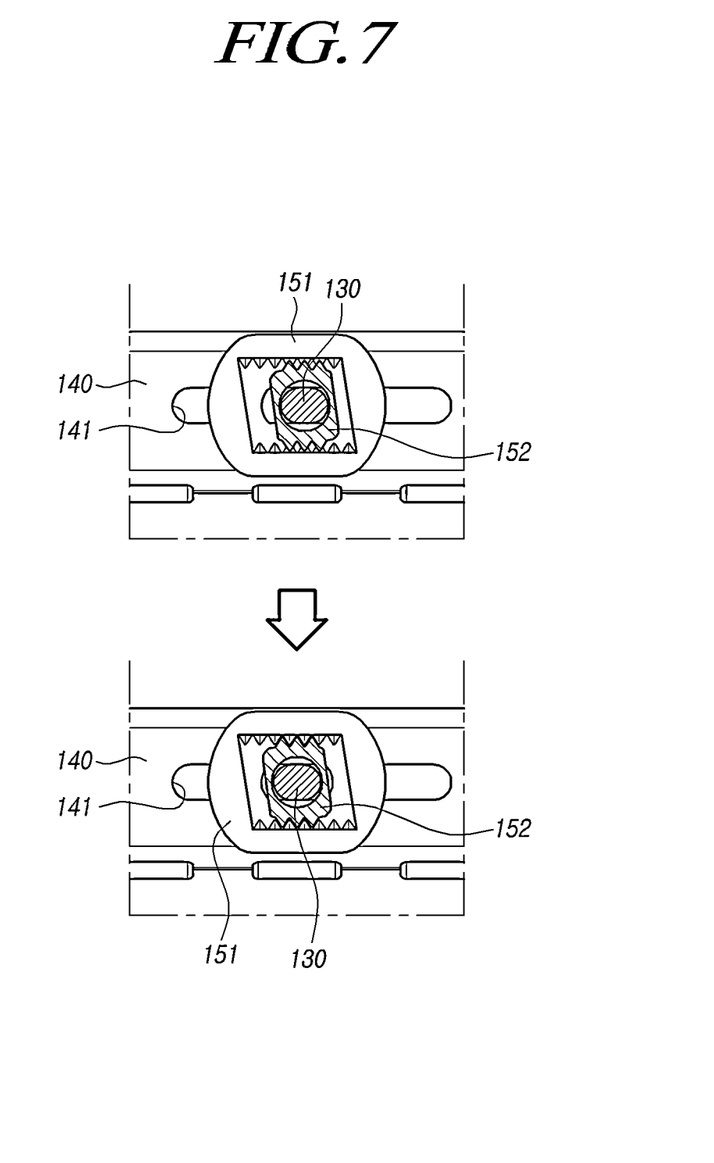
FIG. 7 is a view illustrating an operation of a steering column of a vehicle according to the present embodiments.

FIG. 1 is an exploded perspective view illustrating a steering column for a vehicle according to the present embodiments. FIG. 2 is a front view illustrating an assembled state of FIG. 1. FIG. 3 is a cross-sectional view of FIG. 2. FIG. 4 is an exploded perspective view illustrating a portion of FIG. 1. FIG. 5 is a side view illustrating a portion of FIG. 2. FIG. 6 is a perspective view illustrating a portion of FIG. 1. FIG. 7 is a view illustrating an operation of a steering column of a vehicle according to the present embodiments.

Referring to FIG. 1, a steering column 100 of a vehicle according to the present embodiments includes a plate bracket 110 including a pair of wings 111 facing each other and fixed to a vehicle body, a distance bracket 140 coupled to an outer circumferential surface of an upper column 101, positioned between the pair of wings 111, and including an elongated hole 141 formed in a telescoping direction, an adjust bolt 130 penetrating the pair of wings 111 and inserted into the elongated hole 141, a lever portion 120 coupled to a first end of the adjust bolt 130 to move the adjust bolt 130 in an axial direction of the adjust bolt 130, a first gear 151 coupled to a first end of the adjust bolt 130 to be movable within a predetermined range in the telescoping direction, and a second gear 152 fixed to the second end of the adjust bolt 130 and engaged with or disengaged from the first gear 151 as the adjust bolt 130 is moved in the axial direction of the adjust bolt 130.

The plate bracket 110 is fixed to the vehicle body to support the upper column 101 and the lower column 102 to the vehicle body.

The distance bracket 140 is coupled to the outer circumferential surface of the upper column 101, and the distance bracket 140 is positioned between the pair of wing parts 111 of the plate bracket 110. The distance bracket 140 is coupled to the plate bracket 110 by the adjust bolt 130, the lever portion 120, the first gear 151, and the second gear 152.

As the driver manipulates the lever 121, the upper column 101 and the distance bracket 140 are unlocked or fixedly locked to be movable with respect to the plate bracket 110. If the driver manipulates the lever 121 to the locked state, the adjust bolt 130 is pulled, the distance bracket 140 is pressurized between the wings 111, and the second gear 152 is engaged with the first gear 151, so that locking is done. When the driver manipulates the lever 121 to the unlocked state, the adjust bolt 130 is released, the pressurization of the distance bracket 140 is released, and the second gear 152 is separated from the first gear 151, so that unlocking is done.

The lever portion 120 may be coupled to the first end of the adjust bolt 130 and includes a lever 121 and a cam 122. According to the manipulation of the lever 121, the adjust bolt 130 is moved axially of the adjust bolt 130 by the cam 122, so that the steering column is locked or unlocked. The cam 122 includes a fixed cam and a movable cam. The adjust bolt 130 is moved as the movable cam is moved with respect to the fixed cam in the axial direction of the adjust bolt 130.

The adjust bolt 130 is provided to pass through the wings 111 and the distance bracket 140. The distance bracket 140 includes the elongated hole 141 formed in the telescoping direction, and the adjust bolt 130 is inserted into the elongated hole 141. Therefore, when the steering column is unlocked, the upper column 101 and the distance bracket 140 are supported by the adjust bolt 130 inserted in the elongated hole 141 and, as moved along the direction in which the elongated hole 141 is formed, the telescoping operation may be performed.

Slits 112 may be formed in the wings 111 in the tilting direction. The adjust bolt 130 may be inserted through the slits 112. Accordingly, when the steering column is unlocked, the upper column 101 is moved in the direction in which the slits 112 are formed so that the tilting operation may be performed.

Subsequently, the first gear 151 and the second gear 152 are coupled to the second end of the adjust bolt 130 When the adjust bolt 130 is moved, the first gear 151 is fixed and the second gear 152 is moved along with the adjust bolt 130. In other words, the first gear 151 is coupled to the adjust bolt 130 and is movable in the axial direction of the adjust bolt 130 and is not moved when the adjust bolt 130 is moved. The second gear 152 is fixedly coupled to the adjust bolt 130 and is thus moved along with the adjust bolt 130. As is described below, the first gear 151 has a coupling hole 151a, and the adjust bolt 130 is provided to be inserted through the coupling hole 151a, so that the first gear 151 is movable about the adjust bolt 130. The second gear 152 is fixed to the adjust bolt 130 by a step formed in the second end of the adjust bolt 130 and a nut 154 coupled to the second end. Accordingly, when the adjust bolt 130 is moved by the manipulation of the lever 121, the second gear 152 may be engaged to or disengaged from the first gear 151.

Referring to FIG. 7, the first gear 151 and the second gear 152 are engaged or separated in the axial direction of the adjust bolt 130. When the first gear 151 is moved to the first gear 151 to be engaged with the first gear 151, the gear teeth of the two gears may fail to properly mesh but may rather overlap each other in the axial direction of the adjust bolt 130. To such a tooth-on-tooth engagement, the first gear 151 is coupled to be movable about the adjust bolt 130 within a predetermined range in the telescoping direction.

For example, in the unlocked state, the first gear 151 is fixed in the axial direction of the adjust bolt 130 and is movable by a predetermined range in the telescoping direction, and the second gear 152 is fixed in the telescoping direction and is movable in the axial direction of the adjust bolt 130.

Therefore, if the gear teeth of the first gear 151 and the second gear 152 overlap each other when the driver adjusts the position of the steering wheel by performing the telescoping operation to lock the steering column, a tooth-on-tooth engagement may occur. However, the first gear 151 is moved in the telescoping direction to correct the overlap between the gear teeth, thereby preventing a tooth-on-tooth engagement and allowing both the gears to properly mesh with each other.

Upon switching from the unlocked state to the locked state, the adjust bolt 130 is pulled so that the distance bracket 140 is pressurized by the wings 111 as described above. The first gear 151 is positioned between the wing 111 and the distance bracket 140 (see FIG. 2) and, when the distance bracket 140 is pressurized, is fixed by the pressurization force, and the second gear 152 is engaged with the first gear 151 and is fixed so that the steering column is locked.

Subsequently, if a tooth-on-tooth engagement occurs when the steering column is locked, the driver may be required to unlock and perform the telescoping operation again for proper locking or may apply excessive force to the lever which may damage, e.g., the gear teeth or lever. However, the present embodiments may prevent a tooth-on-tooth engagement when locking the steering column, eliminating the need for performing the telescoping operation several times and preventing damage to components.

Further, if the driver steers with the steering column improperly locked due to a tooth-on-tooth engagement, the steering column may not be fixed in the telescoping direction, so that the steering shaft may pop up, damaging the driver when a shock occurs to the vehicle. However, according to the present embodiments, the steering column may always be properly locked, so that the driver may be protected.

It is preferable that the first gear 151 is movable about the adjust bolt 130 in two opposite directions of the telescoping direction. In other words, the first gear 151 may be moved in both the directions, i.e., both in the direction toward the steering wheel and in the opposite direction. Although the drawings illustrate that the first gear 151 is moved to the right to mesh with the second gear 152, the first gear 151 may be moved to the left. Accordingly, both the gears may properly mesh with each other regardless of the relative position of the second gear 152 to the second gear 152 in the telescoping direction.

It is preferable that the predetermined range in which the first gear 151 is movable in the telescoping direction about the adjust bolt 130 is equal to or larger than the pitch of the first gear 151. For example, the first gear 151 may be moved by half the pitch of the first gear 151 or more, likewise for the direction toward the steering wheel and its opposite direction. Although the drawings illustrate the mountains of the gear teeth overlap as an example, it would be possible to correct the misaligned position of the second gear 152 only when the first gear 151 is movable by half the pitch of the first gear 151 or more in both the right and left directions as viewed on the drawings. Therefore, both the gears may remain properly engaged regardless of the ratio in which the gear teeth overlap.

It is preferable that the predetermined range in which the first gear 151 is movable in the telescoping direction about the adjust bolt 130 is equal to or smaller than twice the pitch of the first gear 151. In other words, the predetermined range in which the first gear 151 is movable is preferably not less than the pitch of the first gear 151 and not more than twice the pitch. For example, the range in which the first gear 151 is movable in the direction toward the steering wheel and its opposite direction both may be limited to not more than the pitch of the first gear 151.

Referring to FIG. 6, the gear teeth of the first gear 151 and the second gear 152 may have sharply tapered tips facing each other (see reference character T). As described above, the first gear 151 and the second gear 152 are engaged to or separated from each other in the directions facing each other along the axial direction of the adjust bolt 130. As the opposite tips of gear teeth of the two gears are tapered, when the two gears are engaged with the two gears misaligned, the first gear 151 may be smoothly moved with the tapered surface of the gear teeth supported. Accordingly, the first gear 151 and the second gear 152 may be correctly engaged with each other. Preferably, as shown in the drawings, the gear teeth of the first gear 151 and the second gear 152 may have two tapered surfaces and, by so-formed gear teeth, the first gear 151 may be smoothly moved in both the directions of the telescoping direction.

A structure of the steering column 100 according to the present embodiments is described below in greater detail with reference to FIGS. 2 to 5.

Referring to FIG. 2, the first gear 151 is positioned between the distance bracket 140 and the wing 111. Accordingly, when the adjust bolt 130 is moved by manipulation of the lever 121, the first gear 151 is not moved together with the adjust bolt 130.

In the locked state, the adjust bolt 130 is pulled, and the wing 111 pressurizes the distance bracket 140, so that the first gear 151 is fixed by the pressurizing force between the wing 111 and the distance bracket 140. In the unlocked state, the adjust bolt 130 is loosened, and the pressurizing force is released, so that the first gear 151 is movable within the predetermined range in the telescoping direction about the adjust bolt 130.

Referring to FIG. 3, the second gear 152 may be positioned on the opposite side from the first gear with the wing 111 disposed therebetween. The second gear 152 may be fixed to the adjust bolt 130 by a step formed in the second end of the adjust bolt 130 and a nut 154 coupled to the second end. A portion of the second gear 152 may be inserted into the slit 112 to be engaged with the first gear 151. The second gear 152 may be formed to be supported on the outer surface of the wing 111 so that, when the adjust bolt 130 is pulled by manipulation of the lever 121, the wing 111 may be supported on the second gear 152 to pressurize the distance bracket 140.

Referring to FIGS. 3 and 4, the first gear 151 may include a guide portion 301 to support movement of the first gear 151 in the telescoping direction. The guide portion 301 may protrude from the surface of the first gear 151, facing the distance bracket 140, and be inserted into the elongated hole 141. As the guide portion 301 is inserted into the elongated hole 141 and is supported on the distance bracket 140, the movement of the first gear 151 in the telescoping direction is supported by the guide portion 301 and the distance bracket 140.

Referring to FIGS. 4 and 5, the second end of the adjust bolt 130 may have a plane portion 130a positioned at the elongated hole 141 and supported on the distance bracket 140. As shown in the drawings, the plane portion 130a may be formed on each of both the upper and lower surfaces of the second end of the adjust bolt 130.

The first gear 151 may be supported on the plane portion 130a. The first gear 151 may include a coupling hole 151a into which the adjust bolt 130 is inserted. As the plane portion 130a is inserted and positioned in the coupling hole 151a, the first gear 151 may be supported by the plane portion 130a. Accordingly, the movement of the first gear 151 in the telescoping direction may be supported by the plane portion 130a.

The coupling hole 151a is formed to be longer in the telescoping direction than the adjust bolt 130 to allow the first gear 151 to be movable about the adjust bolt 130 in the telescoping direction. As shown in FIG. 5, the coupling hole 151a may be formed to be longer than the width of the adjust bolt 130 in the telescoping direction. Further, as the coupling hole 151a is formed to extend in the two opposite directions of the telescoping direction, the first gear 151 may be movable in the two opposite directions about the adjust bolt 130. Further, the coupling hole 151a may be formed to be longer than the adjust bolt 130 by the movable range of the first gear 151 or more in the telescoping direction. In other words, the coupling hole 151*a* may be formed to be longer than the adjust bolt 130 by at least the pitch of the first gear 151 or more, so that the movable range of the first gear 151 is secured.

Referring to FIG. 4, the steering column 100 of a vehicle according to the present embodiments may further include a spring 153 for restoring the first gear 151 to the center of the adjust bolt 130. In other words, the spring 153 is provided so that the first gear 151, moved in the telescoping direction to be engaged with the second gear 152, may be restored to the initial position when switching from the locked state to the unlocked state to be separated from the second gear 152 to correct the misaligned position of the second gear 152. The spring 153 may restore the first gear 151 to the position where the adjust bolt 130 is positioned in the center of the coupling hole 151*a*. Accordingly, when the telescoping operation is performed again, although the first gear 151 has been fixed in the state moved to the telescoping direction during the prior locking, the first gear 151 may be restored to the initial position, which is the position where it is movable in the two opposite directions, to be able to correct the misaligned position of the second gear 152, and it is possible to prevent a tooth-on-tooth engagement when locking is performed again.

The first gear 151 may include a receiving portion 401 for receiving the spring 153. The spring 153 may be received in the receiving portion 401 to provide an elastic force to the first gear 151 with respect to the adjust bolt 130. The receiving portion 401 may be depressed in the surface facing the distance bracket 140 of the first gear 151. This spring 153 may be a torsion spring.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steering column of a vehicle, comprising:
   a plate bracket including a pair of wings facing each other and fixed to a vehicle body;
   a distance bracket coupled to an outer circumferential surface of an upper column, positioned between the pair of wings, and including an elongated hole formed in a telescoping direction;
   an adjust bolt penetrating the pair of wings and inserted into the elongated hole;
   a lever portion coupled to a first end of the adjust bolt to move the adjust bolt in an axial direction of the adjust bolt;
   a first gear coupled to a second end of the adjust bolt to be movable within a predetermined range in the telescoping direction; and
   a second gear fixed to the second end of the adjust bolt and engaged with or disengaged from the first gear as the adjust bolt is moved in the axial direction of the adjust bolt.

2. The steering column of claim 1, wherein the wing has a slit formed in a tilting direction, and wherein the adjust bolt is inserted into the slit.

3. The steering column of claim 1, wherein the first gear is positioned between the distance bracket and the wing.

4. The steering column of claim 3, wherein the second gear is positioned on an opposite side of the first gear with the wing disposed therebetween.

5. The steering column of claim 1, wherein the first gear includes a guide portion inserted into the elongated hole to guide the first gear to move in the telescoping direction.

6. The steering column of claim 1, wherein the second end of the adjust bolt has a plane portion positioned in the elongated hole and supported on the distance bracket.

7. The steering column of claim 6, wherein the first gear is supported on the plane portion.

8. The steering column of claim 1, wherein the first gear includes a coupling hole into which the adjust bolt is inserted, and
   wherein the coupling hole is formed to be longer in the telescoping direction than the adjust bolt.

9. The steering column of claim 8, wherein the coupling hole is formed to be longer in the telescoping direction by a predetermined range or more than the adjust bolt.

10. The steering column of claim 8, further comprising a spring for restoring the first gear to a center of the adjust bolt.

11. The steering column of claim 10, wherein the first gear includes a receiving portion receiving the spring.

12. The steering column of claim 10, wherein the spring is a torsion spring.

13. The steering column of claim 1, wherein the first gear is movable about the adjust bolt in two opposite directions of the telescoping direction.

14. The steering column of claim 1, wherein the predetermined range is equal to or more than a pitch of the first gear.

15. The steering column of claim 13, wherein the predetermined range is equal to or less than twice a pitch of the first gear.

16. The steering column of claim 1, wherein gear teeth of the first gear and the second gear have sharply tapered tips facing each other.

* * * * *